Fig: 1

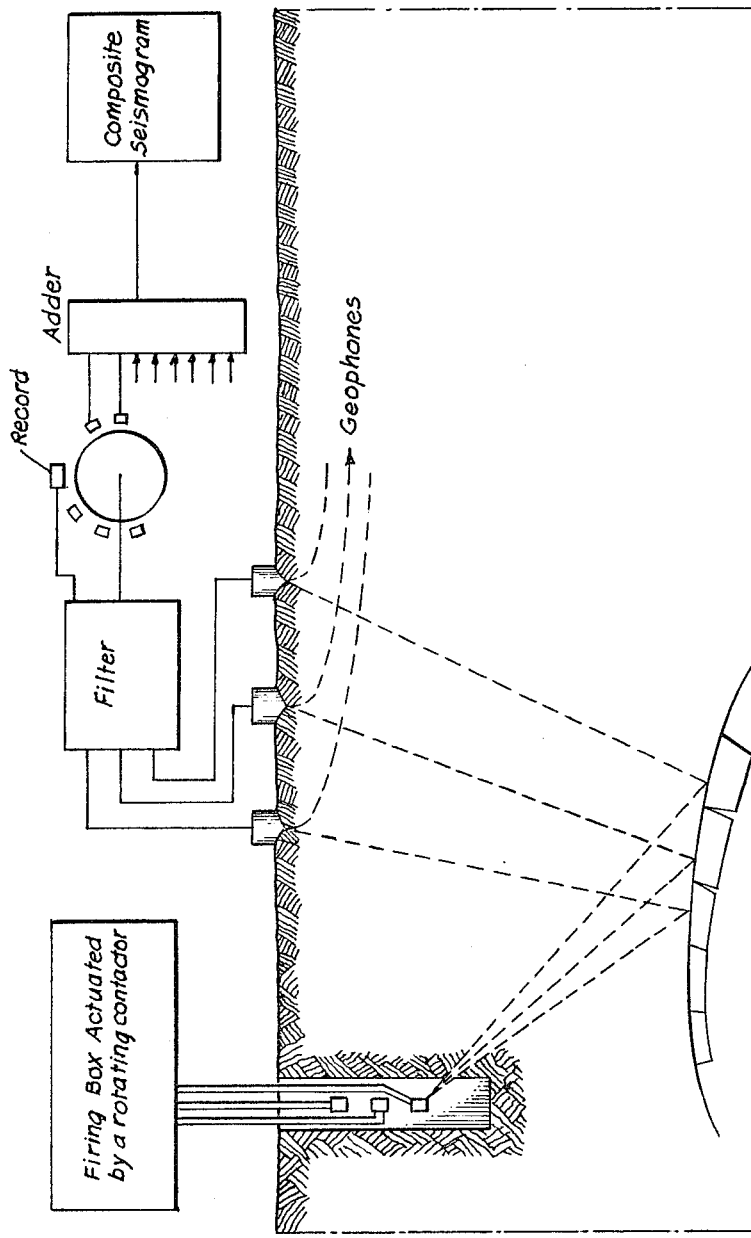

3,365,697
SEISMIC PROSPECTING BY FILTERING THE RECEIVED SEISMIC SIGNALS IN ACCORDANCE WITH THE INVERSE FIRING CODE OF THE TRANSMITTED SIGNALS
Jean-Pierre Fail and Gerard Grau, Paris, France, assignors to Institut Francais du Petrole, des Carburants et Lubrifiants, Rueil-Malmaison, Seine-et-Oise, France
Continuation of application Ser. No. 132,251, June 16, 1961. This application July 11, 1966, Ser. No. 564,448
Claims priority, application France, June 17, 1960, 830,474
15 Claims. (Cl. 340—15.5)

ABSTRACT OF THE DISCLOSURE

The present invention is an improvement over known methods of seismic prospecting wherein the seismic waves are a composite signal having a series of time-spaced elementary pulses of the same form but of different amplitudes so that the amplitudes in association with the time intervals between the pulses form a firing code and the detection is carried out by filtering and decoding the composite signal according to the inverse of the firing code so that a seismogram is obtained corresponding to the emission of a single elementary pulse.

---

Figure 1:
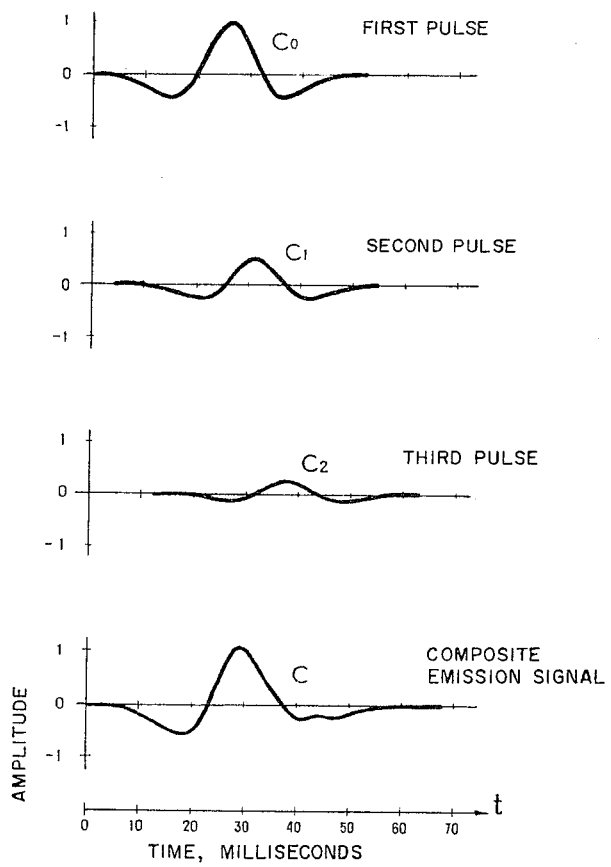

This application is a continuation of copending application Ser. No. 132,251, filed June 16, 1961, now abandoned. Applicants claim priority under 35 U.S.C. 119 for French patent application No. 830,474, filed June 17, 1960.

This invention relates to a seismic prospecting method consisting of generating sequentially a series of shots or shocks according to a given timing and weighting law representative of a selected code and of decoding the corresponding seismogram.

More particularly, the method according to this invention is characterized by the use of a coded signal of a series comprising elementary signals of successively produced similar form and duration but of differing amplitude. In the following, the coding of the amplitude of the signals will be called balancing. A decoding system is employed comprising an appropriate filter providing for the contraction of the corresponding composite seismogram in an elementary seismogram which would have been that corresponding to the emission of a single elementary signal.

The more generally used method in seismic prospecting consists of producing elastic waves, for instance by detonating an explosive charge placed at a given depth in the ground or at the earth surface and of recording, by means of a series of geophones, the corresponding waves as reflected by the interfaces formed between the various earth formations.

This method, commonly used, suffers from certain drawbacks. In particular, when practising said method, it is often difficult to detect within the recorded traces the seismogram the reflections which are related to the geometrical shape of the various earth formations since there are superimposed undesired components resulting from extraneuos perturbations or produced by the explosion, such as, for instance, the surface waves. This is particularly true when these surface waves are of high intensity, for instance, in the case of very loose surface formations since the frequency and intensity of the parasitic waves are related to the elastic properties and the thickness of the surface formations.

It is therefore an object of this invention to substantially reduce the degree of influence of the surface waves in the recorded seismogram.

It is another object of this invention to reduce the degree of influence of the surface waves in the recorded seismogram to such an extent as to avoid saturation of the geophones.

It is a further object of this invention to reduce the degree of influence of the surface waves in the seismogram so as to avoid distortions of the latter resulting from the recording of the harmonics of said surface waves.

It is still a further object of this invention to reduce from the seismogram the relative influence of the surface waves and of other extraneous vibrations, which tend to obscure the recognition of the desired signals so as to facilitate the identification of the reflected and/or refracted signals.

These and other objects, as may be apparent from the following description and claims, are achieved by the process of this invention according to which a series of elementary signals is generated by means of a plurality of successive elementary shots instead of a single one according to the conventional method. The respective amplitudes and/or the time interval between succeeding shots (signals) constitute a code, the composite signal thus being specifically coded. The decoding of such a series not only restores a single elementary signal as in the case of the conventional method but results in a considerable improvement of the signal to noise ratio. If it is not required to improve said ratio, it is still possible, according to this invention, to obtain significant advantages since the same quality of the recording as according to the conventional method may be obtained under less favorable conditions concerning the generation of the elastic waves. This may be done by detonating explosive charges at lower depths which results in a significant saving of time for drilling the shot holes.

The code according to which the composite signal is generated consists of the combined values of the relative amplitudes of the sequential elementary signals emitted and the time lags therebetween, the shape and duration of said elementary signals being invariable.

Let us refere to $s(t)$ as the time function representative of the form of the elementary pulses and to $n_i\tau$ as the series of the time lags between each pulse and the first one, wherein $n_i$ represents the time lag between the first and the $i^{th}$ impulse as measured in $\tau$ time units.

Accordingly, the series $s_1(t)$ of the train of pulses forming the coded signal may be written:

(1) $$s_1(t) = s(t) + \sum_{i=1}^{i=N} a_i \cdot s(t - n_i\tau)$$

wherein the values of the coefficients $a_i$ are proportional to the amplitude of the elementary impulses. These balancing amplitude coefficients determine the weighting of the individual elementary impulses $s(t)$ within the composite and coded signal $s_1(t)$.

In the case where the signals are transmitted through the earth formations according to Hooke's law and where no distortion of the same is to be observed on the seismogram as recorded at constant gain. The seismogram consists of a function $y_1(t)$ representing the recorded vibrations when the ground is submitted to the train of impulses $s_1(t)$ which function $y_1(t)$ is expressed by the equation:

(2) $$y_1(t) = y(t) + \sum_{i=1}^{i=N} a_i \cdot y(t - n_i\tau)$$

wherein $y(t)$ represents the earth movement attributable to a single elementary impulse $s(t)$ which has to be determined according to this invention. Such a determination is carried out by means of a decoding filter restoring the elementary movement $y(t)$ from a composite seismogram $y_1(t)$ obtained as response to the series $s_1(t)$.

The calculation of the filter characteristics is as follows:

The Fourier's transformation, applied to the above Equations 1 and 2 results in:

(3)
$$S_1(\omega) = S(\omega)\left[1 + \sum_{i=1}^{i=N} a_i \cdot e^{-j\omega n_i \tau}\right]$$

wherein $S(\omega)$ is the Fourier's transform of $s(t)$ and $S_1(\omega)$ that of $s_1(t)$, and wherein $e$ is the base of the Naperian logarithms and $j$ is the square root of $-1$, and (4)
$$Y_1(\omega) = Y(\omega)\left[1 + \sum_{i=1}^{i=N} a_i \cdot e^{-j\omega n_i \tau}\right]$$

wherein $Y(\omega)$ is the Fourier's transform of $y(t)$ and $Y_1(\omega)$ that of $y_1(t)$, $\omega$ representing the angular frequency.

Upon consideration of the above Equations 3 and 4 it is apparent that the transfer function for passing from $S_1(\omega)$ to $S(\omega)$ is the same as that for passing from $Y_1(\omega)$ to $Y(\omega)$. This transfer function is:

(5)
$$D(\omega) = \frac{1}{1 + \sum_{i=1}^{i=N} a_i \cdot e^{-j\omega n_i \tau}}$$

By applying to $y_1(t)$ a filter corresponding to said transfer function, it is therefore possible to recover the movement corresponding to $y(t)$.

The Fourier's inverse transform applied to $D(\omega)$ gives the function $d(t)$ constituting the impulse response of the filter by means of which filtration may be carried out through operations in the time-domain.

This function $d(t)$ may be obtained by summation of the Fourier's inverse transforms of each of the terms of the series development of $D(\omega)$:

(6)
$$D(\omega) = 1 - \sum_{i=1}^{i=N} a_i \cdot e^{-j\omega n_i \tau} + \left[\sum_{i=1}^{i=N} a_i \cdot e^{-j\omega n_i \tau}\right]^2 - \cdots$$

provided that the following convergence condition is fulfilled:

(7)
$$\left|\sum_{i=1}^{i=N} a_i \cdot e^{-j\omega n_i \tau}\right| < 1$$

The Fourier's inverse transform, applied to $D(\omega)$ may be written as follows:

(8)
$$d(t) = \delta(t) - \sum_{i=1}^{i=N} a_i \cdot \delta(t - n_i \tau) +$$
$$\sum_{i=1}^{i=N}\sum_{k=1}^{k=N} a_i a_k \delta[t - (n_i + n_k)\tau] + \cdots +$$
$$(-1)^p \sum_{i=1}^{i=N}\sum_{k=1}^{k=N}\cdots\sum_{m=1}^{m=N} a_i a_k \cdots a_m \delta$$
$$[t - (n_i + n_k + \cdots + n_m)\tau] + \cdots$$

The series development of $d(t)$ may be limited to its dominant terms and particularly to those exceeding a certain level below which they would be difficult to detect, and for instance to those terms exceeding the level corresponding to the calculation noise.

By making a correspondence in the above Formula 8 between the coefficients $$(-1)^p \sum_{i=1}^{i=N}\cdots\sum_{m=1}^{m=M}\cdots a_i \cdots a_m$$

and the time lags $(n_i \ldots + n_m)\tau$ the function $d(t)$ representing the impulse response of the filter appears in such a form as to make it possible to realize a corresponding filter by means of retarding devices.

The application of such a filter to the function $y_1(t)$, representing the seismogram corresponding to the series of impulses $s_1(t)$ gives the function $y(t)$ representing the seismogram which would have been recorded if only one elementary impulse $s(t)$ has been emitted.

However, for realizing the filter according to this method it is required that the Taylor's series expansion be applicable to $D(\omega)$, i.e., that the above condition (7) is, in fact, fulfilled. This is achieved by conveniently selecting the amplitude coefficients $a_i$ of the impulses.

In addition, it is preferable to provide for a rapid convergence of said series (6) so as to obtain a satisfactory representation of the function $d(t)$ after transformation of $D(\omega)$ without making use of a large number of samples.

Another method for determining the filter coefficients consists of writing the denominator of $D(\omega)$, i.e., $$\left[1 + \sum_{i=1}^{i=N} a_i \cdot e^{-j\omega n_i \tau}\right] \text{ in the form of the polynomial}$$

$$\left[1 + \sum_{i=1}^{i=N} a_i \cdot x^{n_i}\right] \text{ wherein } x = e^{-j\omega \tau}$$

The polynomial is then rewritten so that the individual terms are arranged in ascending order of the $x$ exponents. Then the quotient 1 over (polynomial) is formed and the resulting terms of that quotient are also arranged in ascending order of the $x$ exponents. It appears, that these terms have as coefficients the same amplitudes values $$(-1)^p \sum_{i=1}^{i=N}\cdots\sum_{m=1}^{m=N} a_i \cdots a_m$$

as already determined according to the Formula 8.

Figure 2:
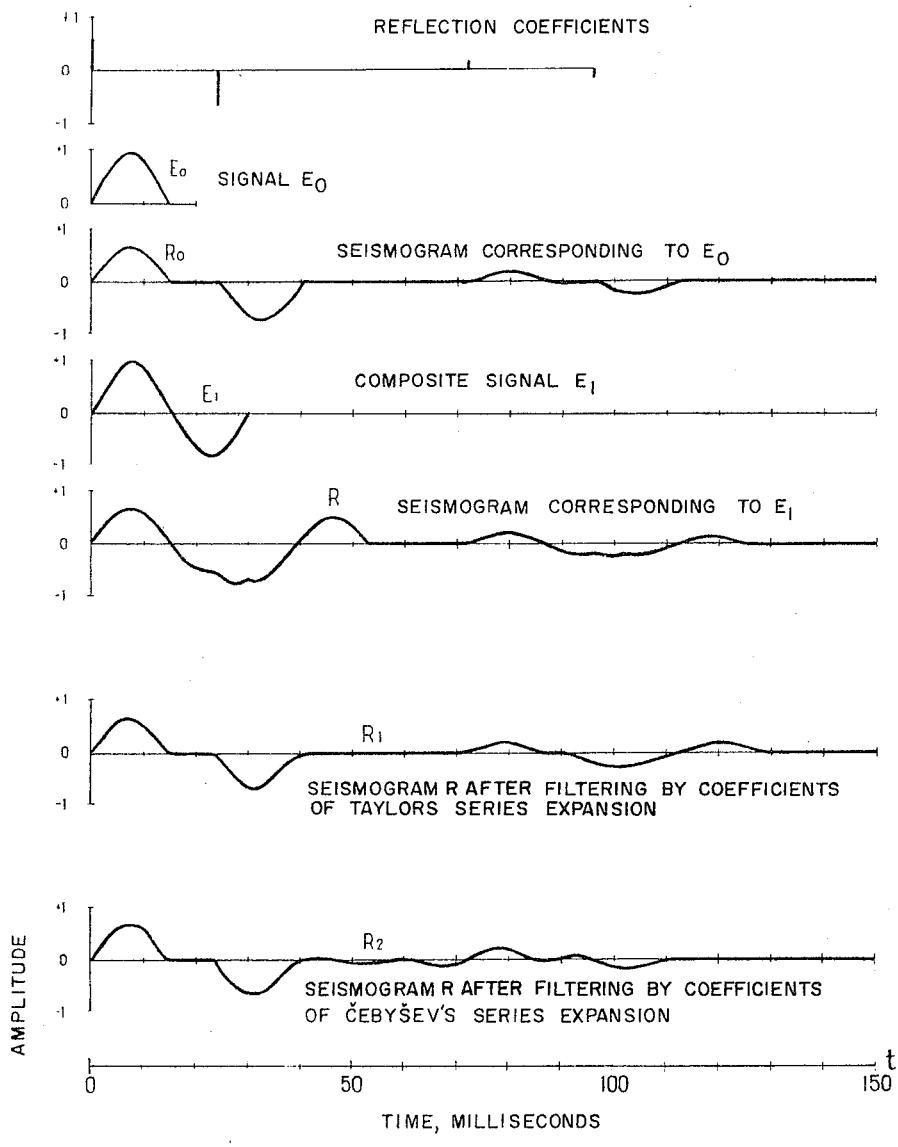

The invention will be more fully understood by reference to the following specific example of calculation of the filter coefficients set forth by way of illustration and the accompanying drawings, wherein:

FIGURE 1 diagrammatically shows the respective elementary impulses of a series and the corresponding composite emission signal, the amplitude of the signals being plotted in similar but arbitrary scales over time, for example, in milliseconds;

FIGURE 2 diagrammatically shows seismograms corresponding respectively to a single half-cycle signal and a two half-cycle signal the second half-cycle of which has an amplitude of 0.8 times that of the first half-cycle and the modified seismograms obtained after filtration, the amplitudes being drawn on a comparable but arbitrary scale, the abscissa being time in milliseconds;

FIGURE 3 illustrates the method of performing the invention by denoting a plurality of charges at one place and recording the corresponding reflected signal at another place by means of geophones and a decoding filter for the treatment of the recorded seismogram.

For exemplifying purposes, the filter coefficients (case of FIG. 1) have ben computed on the basis of a code defined by the respective values 1, ½ and ¼ of the $a_i$ coefficients and 0, 5 and 12 milliseconds of the corresponding time lags $n_i \tau$.

The symmetrical Ricker's impulse has been chosen as basic impulse.

The curves $C_0$, $C_1$ and $C_2$ of FIGURE 1 represent the elementary impulses obtained by applying the $a_i$ and $n_i$ coefficients to the basic impulse. Thus, $C_0$ represents said basic as first elementary impulse ($a_1=1$, $n_1=0$), $C_1$ is derived from $C_0$ by applying thereto an amplitude coefficient $a_1=0.5$ and a time lag $n_1\tau$ of 5 milliseconds and $C_2$ is derived from $C_0$ by applying thereto an amplitude coefficient $a_2=0.25$ and a time lag $n_2\tau$ of 12 milliseconds The corresponding composite signal $s_1(t)$ obtained by summation of the elementary pulses, is represented by the Curve C of FIGURE 1.

The amplitude response $d(t)$ of the decoding filter calculated either according to Formula 8 or by polynomial division has the following coefficients:

| Time in ms. (1) | Coefficients | Time in ms. | Coefficients | Time in ms. | Coefficients |
|---|---|---|---|---|---|
| 0 | +1.0000 | 29 | −0.0940 | 47 | +0.0156 |
| 5 | −0.5000 | 30 | +0.0156 | 49 | −0.0410 |
| 10 | +0.2500 | 32 | −0.0780 | 51 | +0.0390 |
| 12 | −0.2500 | 34 | +0.0940 | 54 | +0.0270 |
| 15 | −0.1250 | 36 | −0.0156 | 56 | −0.0351 |
| 17 | +0.2500 | 37 | +0.0468 | 59 | −0.0176 |
| 20 | +0.0625 | 39 | −0.0780 | 61 | +0.0270 |
| 22 | −0.1880 | 41 | +0.0320 | 63 | −0.0171 |
| 24 | +0.0625 | 42 | −0.0270 | 66 | −0.0200 |
| 25 | −0.0320 | 44 | +0.0590 | 68 | +0.0171 |
| 27 | +0.1250 | 46 | −0.0390 | | |

The coefficients of the above table are limited to those having an absolute value higher than 0.0150, the coefficients of a lower absolute value being neglected. Filters which can be employed are, for example disclosed in "Automatic Feedback Control System Synthesis," by John G. Truxal, McGraw-Hill Electrical and Electronic Engineering Series Ed., McGraw-Hill Inc., 1955, p. 62 et seq.

It has been establishd that, by applying to the series of pulses $s_1(t)$ the filter corresponding to the above coefficients, the elementary impulse $s(t)$ is restored. It is therefore possible from the recorded trace of the seismogram to reconstitute the earth movement attributable to the elementary pulse $s(t)$.

There may also be used, for example, a delay line filter as described in Geophysics, vol. 20, 1955, pp. 748–751, "Delay Line Filtering," which is further illustrated in FIGURE 4 of the accompanying drawing.

The operation of such an apparatus for performing the method of this invention will be described hereinafter.

The seismogram recorded at each place is separately treated in said apparatus by applying thereto the time lags and the corresponding coefficients. After frequency modulation, it is recorded on a magnetic revolving drum by means of a record head. Reproduce heads of a number equal to the number of time units of the maximal time lag of the filtering operator (68 in the case of the filtering operator given by the above table) are regularly distributed over the periphery of the drum, so that the distance between two adjacent reproduce heads corresponds to the peripheral displacement of the drum in a time unit (the revolving speed of the drum being adjusted therefor).

The seismogram is picked up on those reproduce heads placed at respective distances from the record head which correspond to the time lags of a filtering operator (heads Nos. 5, 10, 12 . . . 66, 68 in the case of the filtering operator given by the above table, designated by radial dash-points in FIGURE 4).

Each of these delay seismograms, after demodulation in the respective demodulators associated to said reproduce heads, is multiplied by the coefficient associated in the filtering operator to the time lag corresponding to the reproduce head delivering said seismogram ($k_5$, $k_{10}$ . . . $k_{68}$ in the case of the filtering operator given by the above table, wherein $k_5 = -0.500$, $k_{10} = +0.2500$, $k_{12} = 0.2500$ . . . $k_{68} = +0.171$), by potentiomter means, and all the so weighted delayed seismograms are added together in a summing circuit comprising an operational amplifier. The resulting seismogram, modified according to the invention (trace $R_1$ or $R_2$) is obtained at the output of the operational amplifier.

The scope of the present invention is, however, by no way limited to the exclusive use of the coefficients obtained by development in Taylor's series or polynomial division. There may be advantageously used, for instance, other coefficients obtained by series development of $D(\omega)$ in Čebyšev's polynomials instead of the development in Taylor's series as according to Formula 6 above (see Lanczos: "Applied Analysis," edited by Pitman-London, p. 481).

It is known that, by means of said Čebyšev's polynomials the series development of such terms as $$\frac{1}{a+x}$$

can be obtained provided that $|x|<1$. By this way the term $$\frac{1}{1+X}$$

is susceptible to series development even where $|X|>1$, which was impossible by use of the Taylor's series. As a matter of fact the term $$\frac{1}{1+X}$$

may be written in the form $$\frac{1}{A\left(\frac{1}{A}+\frac{X}{A}\right)}$$

wherein A is a number selected higher than X, this latter form corresponding to the term $$\frac{1}{a+x}$$

wherein $$a=\frac{1}{A}$$

and $$x=\frac{X}{A}$$

It is therefore possible to obtain series developement of $D(\omega)$ in polynomials in $X/A$, the modulus of which is lower than 1. There may thus be written (9) $$D(\omega)=\frac{1}{A\left[\frac{1}{A}+\frac{\sum_{i=1}^{i=N} a_i \cdot e^{-j\omega n_i \tau}}{A}\right]}$$

wherein A complies with the following requirements:

$$\left|\sum_{i=1}^{i=N} a_i \cdot e^{-j\omega n_i \tau}\right|<A$$

(10) $$-1>\frac{1}{A} \text{ or } \frac{1}{A}>0$$

This type of series development offers the advantage, as compared to that of Taylor, of being always applicable even where the above convergence condition (7) is not fulfilled. Also, in numerous cases there is a more rapid convergence of the series, by selection of a convenient value of A.

Considering this type of series development for calculating the filter coefficients, it is therefore possible to select at will the coefficients $a_i$ and $n_i$, respectively, defining the amplitude and the timing of the elementary pulses, and out of the corresponding seismogram one than restores the basic elementary pulse by application of the corresponding filter.

The decoding method according to the present invention may also be applied with similar advantage to contraction of a non-coded signal provided that it corresponds to the sum of elementary signals of similar shape and duration, but of different amplitudes and different time intervals of production. Such a long signal may be converted by use of the filter according to this invention into a shorter signal, there being theoretically no limitation to the contraction factor.

Similarly, a seismogram corresponding to a signal of long duration may be converted by the same way to the seismogram corresponding to a shorter signal, which results in a better resolution of the recording.

FIGURE 2 illustrates by way of example results obtained by application of the filter according to this invention to the trace R of the seismogram corresponding to a composite two half-cycle signal, represented by $E_1$, the second half-cycle of which has the same length as the first one but an amplitude reduced to 0.8 times that of the first half-cycle. A comparative seismogram corresponding to a single half-cycle signal $E_0$ identical with the first half-cycle of the composite signal $E_1$ is represented by $R_0$.

These various seismograms are obtained on the basis of the same reflection coefficients of an assumed subsurface interface.

The composite signal $s_1(t)$, represented by $E_1$, can be expressed as follows:

$$s_1(t) = s(t) - 0.8s\left(t - \frac{T}{2}\right)$$

wherein $s(t)$ is the representative function of the single half-cycle signal $E_0$ and $T/2$ is the half-period corresponding to the length of said half-cycle.

Two filters according to this invention have been applied to the trace R of the seismogram $Y_1(t)$, each filter corresponding to a series of six values respectively calculated according to the Taylor's series expansion and the Čebyšev's polynomial series.

The amplitude response of the filter corresponding to the application of the Taylor's series (Formula 8) consists of delta functions regularly spaced from one another at intervals of half a period $(T/2)$ and equal to the successive powers of 0.8.

The amplitude response of the filter, calculated by application of the Čebyšev's polynomial series, has the following coefficients:

| Time (in ms.): | Coefficients |
| --- | --- |
| 0 | +0.707 |
| 15 | +0.697 |
| 30 | +0.668 |
| 45 | +0.550 |
| 60 | +0.302 |
| 75 | +0.076 |

(For a filter application here see Truxal, supra.) It is apparent from the drawing (FIGURE 2) that the traces $R_1$ and $R_2$ obtained by filtration of the same trace R, respectively by application of the Taylor's series ($R_1$) and the Čebyšev's polynomial series ($R_2$), are very similar to the trace $R_0$ of the seismogram obtained from $E_0$, which clearly proves the improvement in the resolution of the recording attainable by the method of the invention.

Although the above example relates to a composite signal comprising only two half-cycles, the method according to this invention may be applied with similar advantage to longer signals provided that the elementary signals of which they are constituted are of similar shape and duration. Hence, if a series of shots are being generated to provide a coded signal, there will result a composite seismogram. From this composite seismogram one now can recover the elementary seismogram which would have been produced if only a single shot had been generated.

In practical cases, however, the coding characteristics cannot be selected at will with a high degree of accuracy since the yield of elementary shots cannot be determined exactly and the decoding operation will consequently result in a certain distortion or noise.

Still another noise results from the fact that, for practical reasons, some of the coefficients for the filter have been neglected.

In view of carrying out the invention the code and the distances between the various shot points must be selected so as to substantially reduce the surface waves, which would otherwise, in spite of the filtration, generate harmonics which are undesirable at the recording. Accordingly, the number and the locations of the various shots as well as the filtration either by electrical means or by use of a plurality of seismometers, are chosen so as to limit the amplitude of the surface waves to a maximum value lower than the noise level.

Concomitantly with the decoding operation, a contraction of the signal may be effected by means of a convenient filter. In such a case the overall amplitude response will be obtained by convolution of the amplitude responses of the two filters.

Besides, the decoding operation results in a decrease, by a balancing effect, of the external random noises superimposed on seismic reflection. Such a balancing effect could not be obtained by the conventional seismic methods except by addition in a seismic play-back office, of a plurality of traces obtained by recording separate shots.

By way of example there may be used a series of successive shots spaced from one another by a time lag of from a few milliseconds to a few hundred of milliseconds, these time intervals being obtainable by use of a firing box actuated by a rotating contactor sequentially initiating the firing of the respective explosive charges according to the desired order and timing. See for example U.S. Patent No. 2,706,011, issued to Bayhi or where a firing box for time-spaced seismic shots is described.

The various amplitude coefficients $a_i$ of the elementary pulses may individually be attained either by exploding charges of different weights, or by effecting a predetermined plurality of simultaneous explosions of similar charges. In this latter case, to each coefficient $a_i$ there will correspond a certain number of elementary shots which must be determined by the formulas given above and in accordance with the nature of the earth formations.

An automatic gain control cannot be used for recording a coded signal, in view of its non-linearity which renders impossible, at least theoretically, the use of a decoding filter. Besides, the length of the coded signal must be so selected that the travel time through the earth formations which corresponds to the minimum amplitude ratio at which a discrimination between the reflected signals as recorded is still possible (of the order of 30 decibels) is longer than the signal duration.

In the case of a recording with modulation it is required that the modulation ratio of the reflection of the higher amplitude be at most equal to 70% and that of the reflection of the lower amplitude at least equal to 2%, these two values corresponding respectively to the higher and the lower threshold limits of the modulation ratio.

Practically the decoding operation may be carried out by use of any retarding device providing means for setting both time lags and weighting coefficients. There may be used, for instance, a magnetic delay drum having a number of magnetic heads which in most cases may be limited to about twenty. Devices of this kind are, for example, shown in "Magnetic Delay Line Filtering Techniques," in Geophysics, volume XX, No. 4, October 1955, pages 748–750.

However, there may be used any other equivalent process such as, for example, an optical process comprising a variable area or variable density recording of the trace to be decoded on a transparent film. In such a case the filtering is carried out by moving said film in front of a plurality of apertures of convenient sizes having their longitudinal axes spaced from one other at intervals corresponding to time lags between the delta of the decoding filter, each of said apertures being covered by a film the darkening degree of which corresponds to a delta coefficient. For a description of an apparatus which may be used for performing such optical correlation methods, see, for instance, French Patent No. 1,313,715, particularly FIGURES 1, 3 and 4.

It is understood that this invention is susceptible to modifications in order to adapt it to different usages and conditions and, accordingly, it is desired to comprehend such modifications within this invention as may fall within the scope of the appended claims.

What is claimed is:

1. A seismic prospecting method comprising, in combination, the steps of emitting from a local area a composite signal consisting of a series of time-spaced elementary pulses of the same form and period but of different amplitudes, said amplitudes in association with the time intervals between said pulses forming a firing code, decoding the corresponding seismogram of the reflected signals obtained from a receiver located in another local area by means of filtering said reflected signals according to the inverse of said firing code, and obtaining a seismogram corresponding substantially to the emission of a single elementary pulse.

2. A method according to claim 1, wherein each elementary pulse is produced by exploding a charge the intensity of which corresponds to the desired amplitude coefficient of said pulse.

3. A method according to claim 1, wherein each elementary pulse is produced by exploding a number of similar charges which corresponds to the desired amplitude coefficient of said pulse.

4. A seismic prospecting method comprising, in combination, the steps of emitting from a local area a long composite signal consisting of a plurality of elementary signals having the same duration and the same form but of different amplitudes, said signals time-spaced from one another by time intervals selected whereby the total duration of the signal is lower than the travel time through the earth formations corresponding to the minimum amplitude ratio at which a discrimination between the reflected signals as recorded is achievable, said signals forming a firing code, receiving reflected signals in another local area; and of decoding the corresponding seismogram of the received reflected signals, by means of filtering said received reflected signals according to the inverse of said firing code, said filtering including converting said received reflected signals by contracting said seismogram to a seismogram corresponding to a half period of said long composite signal.

5. A method according to claim 4, wherein each elementary pulse is produced by exploding a charge the intensity of which corresponds to the desired amplitude coefficient of said pulse.

6. A method according to claim 4, wherein each elementary pulse is produced by exploding a number of similar charges which corresponds to the desired amplitude coefficient of said pulse.

7. A seismic prospecting method comprising, in combination, the steps of emitting from a local area a composite signal consisting of a series of time-spaced elementary pulses of the same form and period but of different amplitudes, said amplitudes in association with the time intervals between said pulses forming a firing code; and decoding the corresponding seismogram of the reflected signals as received in another local area according to the inverse of said firing code by applying coefficients to a decoding filter, said coefficients obtained by application of the Fourier's inverse transform to the terms of the series development of the transfer function corresponding to the characteristics of said code, said filter converting the seismogram corresponding to the composite signal to a seismogram corresponding to a single elementary pulse.

8. A method according to claim 7, wherein the filter coefficients are obtained by division of polynomials.

9. A method according to claim 7, wherein each elementary pulse is produced by exploding a charge the intensity of which corresponds to the desired amplitude coefficient of said pulse.

10. A method according to claim 7, wherein each elementary pulse is produced by exploding a number of similar charges which corresponds to the desired amplitude coefficient of said pulse.

11. A seismic prospecting method comprising, in combination, the steps of emitting from a local area a composite signal consisting of a series of time-spaced elementary pulses of the same form and period but of different amplitudes wherein the sum of the amplitude coefficients of all the pulses of the series is lower than 2, said coefficients expressing the ratio of the amplitude of each elementary pulse to the maximum pulse amplitude in the series, said amplitude coefficients in association with the time intervals between said pulses consistituting a code; and decoding the corresponding seismogram of the reflected signal as received in another local area, by applying coefficients to a decoding filter, said coefficients obtained by application of the Fourier's inverse transform to the term of the Taylor's series development of the transfer function corresponding to the characteristics of said code, said filter converting the seismogram corresponding to the composite signal to a seismogram corresponding to a single elementary pulse.

12. A seismic prospecting method comprising, in combination, the steps of emitting from a local area a composite signal consisting of a series of time-spaced elementary pulses of the same form and period but of different amplitudes, the coefficients of said amplitudes in association with the time intervals between said pulses constituting a code, and decoding the corresponding seismogram of the reflected signal as received in another local area, by applying coefficients to a decoding filter, said coefficients obtained by application of the Fourier's inverse transform to the terms of Cebysev's polynomial series developed of the transfer function corresponding to the characteristics of said code, said filter converting the seismogram corresponding to the composite signal to a seismogram corresponding to a single elementary pulse.

13. In a method of seismic prospecting comprising:
 (a) creating seismic waves in the earth's surface;
 (b) detecting the waves after reflection from the interfaces of the substrata by generating corresponding electrical signals; and
 (c) recording to electrical signals in coordination with time, the improvement comprising:
 (d) said seismic waves comprising a composite signal having a series of time-spaced elementary pulses of the same form and period but of different amplitudes, whereby said amplitudes in association with the time intervals between said pulses form a firing code; and
 (e) said detecting comprises filtering and decoding said composite signal according to the inverse of said firing code whereby a seismogram is obtained corresponding to the emission of a single elementary pulse.

14. An apparatus for seismic prospecting comprising:
 (a) means for successively detonating a plurality of charges at unequal time intervals, at a local area, whereby a composite signal consisting of a series of unequally time-spaced elementary pulses of the same form and different amplitudes is produced, said composite signal forming a firing code;
 (b) means for recording as a seismogram said composite signal in a second local area after reflection of said composite signal from subterranean strata; and
 (c) means for applying the inverse of said firing code and filtering said seismogram including a plurality of retarding means associated with a weighting means and a summing circuit.

15. In an apparatus for seismic prospecting comprising:
 (a) means for creating seismic waves in the earth's surface;
 (b) means for detecting the waves after reflection from the interfaces of the substrata by generating corresponding electrical signals; and (c) means for recording the electrical signals in coordination with time, the improvement comprising:

(d) said means for creating seismic waves comprising means for successively detonating a plurality of charges at unequal time intervals whereby a composite signal consisting of a series of unequally time-spaced elementary pulses of the same form and different amplitudes is produced, said composite signal forming a firing code; and (e) said means for detecting includes means for recording as a seismogram said composite signal and means for applying the inverse of said firing code and filtering said seismogram including a plurality of retarding means associated with a weighting means and a summing circuit whereby a seismogram is obtained corresponding to the emission of a single elementary pulse.

References Cited

UNITED STATES PATENTS

| | | | |
|---|---|---|---|
| 2,156,198 | 4/1939 | Scherbatskoy | 181—.5 |
| 2,320,248 | 5/1943 | Shimek | 181—.5 |
| 2,706,011 | 4/1955 | Bayhi | 181—.5 |
| 3,076,176 | 1/1963 | Lawrence | 181—.5 X |
| 3,096,846 | 7/1963 | Savit et al. | 181—.5 |

OTHER REFERENCES

Geophysics, vol. 20, No. 4, October 1955, "Magnetic Delay Line Filtering Techniques," by Hal J. Jones et al., pp. 746–752 and 762–765 relied on.

RODNEY D. BENNETT, *Primary Examiner.*

SAMUEL FEINBERG, *Examiner.*

M. F. HUBLER, *Assistant Examiner.*